United States Patent [19]
Underwood

[11] 3,876,279
[45] Apr. 8, 1975

[54] RISER PANEL LUG
[75] Inventor: Joseph Underwood, Conyers, Ga.
[73] Assignee: I-T-E Imperial Corporation, Spring House, Pa.
[22] Filed: Nov. 12, 1973
[21] Appl. No.: 414,697

[52] U.S. Cl. ...... 339/272 UC; 24/81 CR; 24/81 CC; 24/115 R
[51] Int. Cl. ............................................ H01r 11/10
[58] Field of Search .......... 339/242, 272; 24/81 CR, 24/81 CC, 115 R, 135 N; 403/385, 390, 399, 400

[56] References Cited
UNITED STATES PATENTS
3,742,431  6/1973  Kobyner ...................... 339/272 UC
3,816,817  6/1974  Ball et al .......................... 339/242

FOREIGN PATENTS OR APPLICATIONS
1,354,639  1/1964  France ........................ 339/272 UC
620,094   3/1949  United Kingdom .......... 339/272 UC Primary Examiner—Joseph H. McGlynn
Attorney, Agent, or Firm—Ostrolenk, Faber, Gerb & Soffen

[57] ABSTRACT

A lug for a riser panel is constructed with a U-shaped main lug section defining a channel through which the main cable extends. Cooperating interlocking formations mount an auxiliary lug section near the free ends of the U arms in a manner such that with a main cable extending through the channel of the main section, the auxiliary section may be mounted and dismounted. A main clamping screw extends through the auxiliary section to clamp the main cable and an auxiliary screw mounted to the auxiliary section extends into a recess thereof to clamp a branch wire entered into the recess.

3 Claims, 17 Drawing Figures

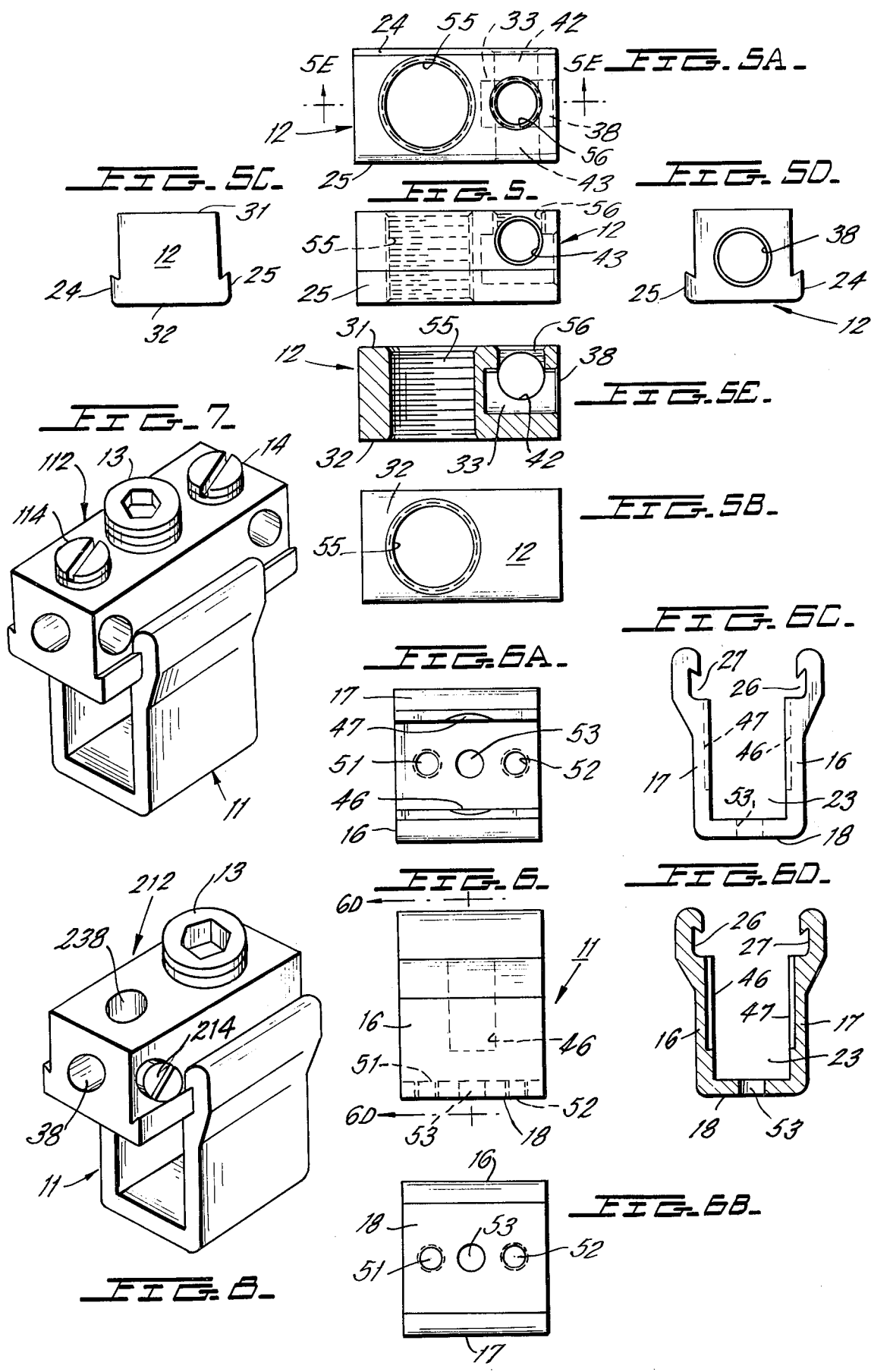

RISER PANEL LUG

This invention relates to wiring lugs and more particularly relates to a lug of this type used in riser panels.

Power is often tapped from a main distribution cable extending through a riser panel without cutting the cable but by merely stripping insulation from a limited length of the main cable and clamping a main lug thereto. The branch cable is connected to a sub-feed or auxiliary lug which in turn is connected to the main lug. In accordance with teachings of the prior art, riser lugs are also constructed with a sub-feed lug positioned at one side of the base for the main lug. This increases the width of the riser lug over the main lug by a minimum of one sub-feed lug width. When three of these prior art riser lugs are mounted on a base for use in a riser panel, the overall width of the riser lug assembly is three times the width of a single riser lug, thereby making it necessary to utilize a relatively wide wiring gutter.

In accordance with the instant invention, a riser lug is constructed to have essentially the same width as the main lug. The sub-feed lug is mounted to the main lug so as to constitute one wall defining a channel through which the main cable extends. Clamping screws for both the main and branch cables are mounted to the sub-feed lug. Interlocking means mechanically secure the sub-feed lug to the main lug while permitting mounting and dismounting of the sub-feed lug without disturbing a main cable extending through the wiring channel of the main lug. In addition, the interlocking means are constructed to resist components of clamping forces tending to spread the arms of the main lug.

Accordingly, a primary object of the instant invention is to provide a novel, compact construction for a riser lug.

Another object is to provide a riser lug of this type that is convenient to install.

Still another object is to provide a riser lug of this type that is essentially the width of the main lug section.

A further object is to provide a riser lug of this type in which the clamping screws for both the main and branch cables are mounted directly to the branch lug section.

These objects as well as other objects of this invention will become readily apparent after reading the following description of the accompanying drawings in which:

FIG. 1 is a perspective of a riser lug constructed in accordance with teachings of the instant invention and having main and branch cables mounted thereto.

FIGS. 2 and 3 are cross-sections taken through the respective lines 2—2 and 3—3 of FIG. 1, looking in the directions of the respective arrows 2—2 and 3—3.

FIG. 5 is a side elevation of the auxiliary lug member.

FIGS. 5A and 5B are plan and bottom views respectively of the auxiliary lug member.

FIGS. 5C and 5D are opposite end views of the auxiliary lug member.

FIG. 5E is a cross-section taken through line 5E—5E of FIG. 5A, looking in the direction of arrows 5E—5E.

FIG. 6 is a side elevation of the main lug member.

Figure 1:
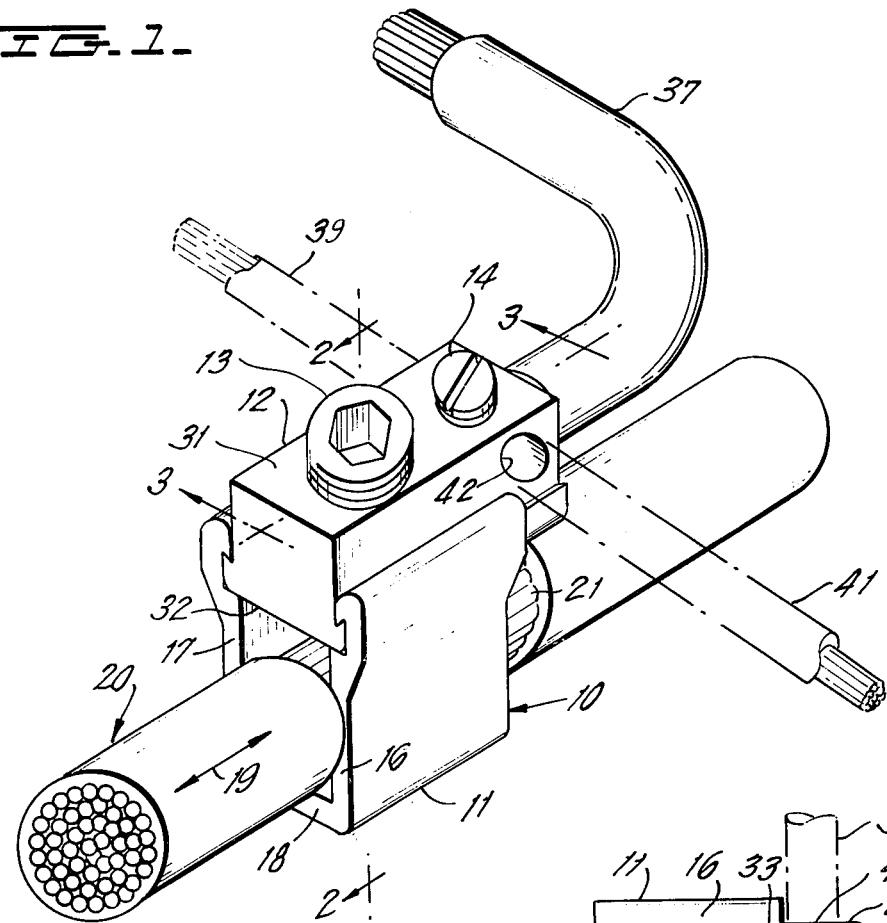

FIGS. 6A, 6B, and 6C are respectively plan, bottom, and end views of the main lug member.

FIG. 6D is a cross-section taken through line 6D, 6D of FIG. 6, looking in the directions of arrows 6D, 6D.

FIG. 7 is a perspective illustrating a second embodiment of this invention.

FIG. 8 is a perspective illustrating a third embodiment of this invention.

Now referring particularly to the FIGS. 1–6D, riser lug 10 consists of four components, namely, main lug section 11, branch or auxiliary lug section 12, main clamping screw 13, and auxiliary clamping screw 14. Main lug section 11 is of generally U-shaped cross-section, including spaced arms 16 and 17, connected by web 18. Main distribution cable 20, extending in an axial direction indicated by double-headed arrow 19, is stripped of insulation at section 21 which extends through the open-ended channel between arms 16 and 17.

Auxiliary lug section 12 is an elongated block-like element having parallel threaded apertures 55, 56 for clamping screws 13, 14, respectively. Aperture 55 for screw 13 extends from surface 31 completely through auxiliary section 12 to surface 32, and aperture 56 for screw 14 extends from surface 31 to recess 33 at one end of section 12. Auxiliary section 12 is mounted to main section 11 by interlocking formations consisting of axially extending channels 26, 27 in the interior surfaces of the respective U-arms 16, 17. Channels 26, 27 receive complementary axially extending protrusions 24, 25 positioned along opposite sides of auxiliary section 12. It is noted that the upper edges of extensions 24, 25 are undercut and that the upper portions of U-arms 16, 17 are hooked over these undercuts to prevent the upper ends of arms 16, 17 from spreading when clamping forces are applied to cable 20 by main clamping screw 13.

Figure 4:
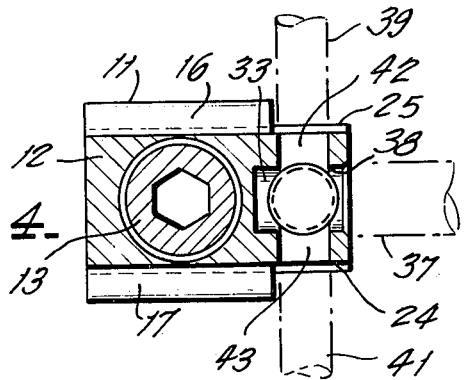
FIG. 4 is a cross-section taken through line 4—4 of FIG. 3, looking in the direction of arrows 4—4.

The latter extends through threaded aperture 55 into main section cable channel 23 to engage stripped section 21 of cable 20 and clamp the latter against the inner surface of web 18. An end of branch wire 37 may be inserted into recess 33 through end aperture 38 in auxiliary section 12 to be engaged by screw 14 which clamps cable 37 against the inner surface of recess 33. In place of utilizing end entrance 38 to recess 33 and then bending branch wire 37, as seen in FIGS. 1 and 4, to project sideways from the wiring gutter, branch wires 39 or 41 may be inserted into recess 33 through side apertures 42, 43 in auxiliary section 12.

Figure 2:
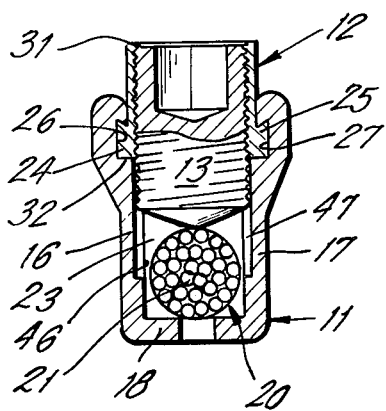
Figure 3:
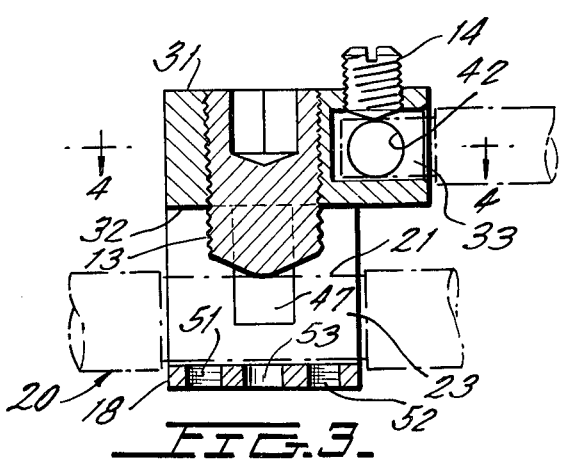

It is noted that the interior surfaces of arms 16, 17 are provided with opposed shallow recesses 46, 47 respectively, which receive the portion of main clamping screw 13 that extends below auxiliary section 12 in FIG. 2. The cooperation of screw 13 and recesses 46, 47 fixes the axial position of auxiliary section 12 relative to main section 11.

Threaded apertures 51, 52 and clearance apertures 53 are provided in web 18 to permit securement of riser lug 10 to an insulating support base (not shown) which also mounts riser lugs for additional main distribution cables.

Riser lug 10 is utilized by withdrawing main clamping screw 13 from channel 23 and then sliding auxiliary section 12 axially until it separates from main section 11. Then stripped portion 21 of distribution cable 20 is placed into channel 23 through its open upper end. Thereafter, interlocking formations 24–27 are reengaged and auxiliary section 12 is mounted to main section 11 and positioned so that main clamping screw 13 is aligned with recesses 46, 47. Main clamping screw 13 is tightened to provide a firm electrical connection between main cable 20 and riser lug 10. Branch wire 37 is then inserted into auxiliary lug recess 33 and auxiliary clamping screw 14 is tightened to form a good electrical connection between branch wire 37 and riser lug 10.

In the embodiment of FIGS. 7 and 8 elements identical to elements in the embodiment of FIG. 1 are designated by identical reference numerals.

Auxiliary section 112 of FIG. 7 is provided with auxiliary clamping screws 14, 114 positioned on opposite sides of main clamping screw 13 and extending parallel thereto into recesses at opposite ends of auxiliary section 112. Each of these recesses is accessible through apertures at opposite sides of section 112 as well as through an end thereof, just as recess 33 of FIG. 4 is accessible from three different directions.

Auxiliary section 212 is provided with auxiliary clamping screw 214 extending at right angles to main clamping screw 13 into a recess accessible through end aperture 38, top aperture 238, and a bottom aperture (not shown).

It should now be apparent to those skilled in the art that the auxiliary section may be provided with more than two auxiliary clamping screws. It should also be apparent that the main and auxiliary sections of the lug may be proportioned so that a portion of the auxiliary sections does not extend beyond either end of the main section.

Although there have been described preferred embodiments of this novel invention, many variations and modifications will now be apparent to those skilled in the art. Therefore, this invention is to be limited not by the specific disclosure herein but only by the appending claims.

The embodiments of the invention in which an exclusive privilege or property is claimed are defined as follows:

1. Lug means for establishing an electrical connection between a main cable and a branch wire including a main section forming a generally U-shaped open-ended channel to receive a main cable and including a web and generally parallel spaced arms having axially extending interior formations with undercut upper edges at the free ends of said arms and having transversely extending sector-shaped interior recesses in said arms; an auxiliary section including a recess to receive a branch wire and having transversely opposing and axially extending exterior formations with undercut upper edges for removably mounting said auxiliary section to said main section with close engagement of the formations to resist components of clamping forces tending to separate the spaced arms of said main section and to confine relative motion between said main and auxiliary sections to an axial direction and having a body portion which projects beyond said arms; an adjustable main clamping screw threadably engaging a tapped aperture in said auxiliary section and projecting into said channel transversely to said axial direction to clamp a cable positioned therein into firm electrical engagement with said lug means and cooperating by extension into said interior recesses to establish an axial position of said auxiliary section relative to said main section; and an adjustable auxiliary screw threadably engaging a second tapped aperture in said auxiliary section and projecting into said recess transversely to said axial direction and parallel to said main clamping screw to clamp a wire entering into said recess against said auxiliary section.

2. Lug means as set forth in claim 1 in which the screws are transverse to each other and transverse to said axial direction.

3. Lug means as set forth in claim 1 including another recess in said auxiliary section to receive another branch wire, and another auxiliary screw projecting into said another recess to clamp a wire entered into said another recess against said auxiliary section.

* * * * *